June 6, 1933.  A. L. BECKET  1,912,818
MILK BOTTLE CHEST
Filed Oct. 8, 1929
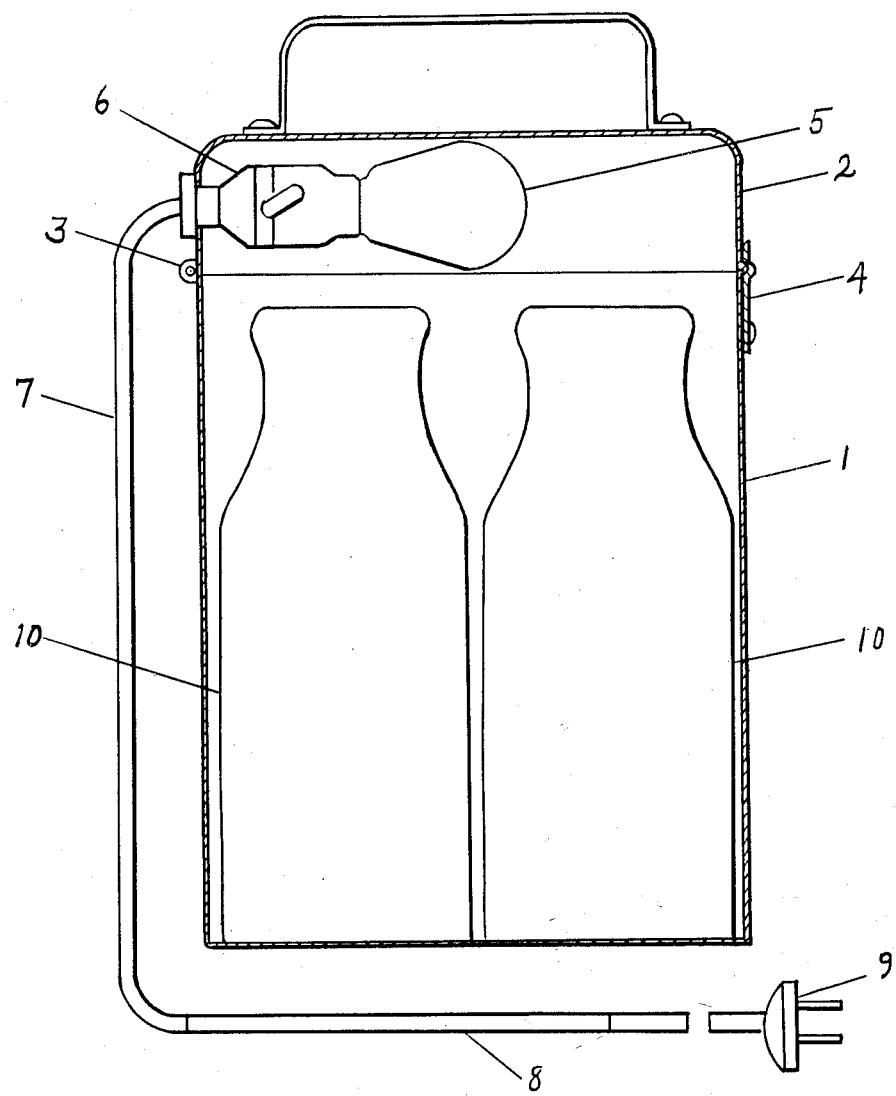
INVENTOR
BY Alan L. Becket
ATTORNEY Patented June 6, 1933

1,912,818

UNITED STATES PATENT OFFICE

ALAN L. BECKET, OF EAST ORANGE, NEW JERSEY

MILK BOTTLE CHEST

Application filed October 8, 1929. Serial No. 398,153.

The present invention relates to a non-freezing container and the present application is a continuation in part of my copending application Serial No. 141,906, filed October 16th, 1926.

The drawing is a side cross sectional view of the container. The main portion of the container 1 is provided with a tightly fitting cover 2 hinged thereon at 3 and a spring catch 4. An electric lamp 5 and a switch socket 6 are located in the cover 2. The cord 7 is provided with a covering 8 and contact plug 9. Milk bottles 10 are beneath lamp 5.

The electric lamp switch socket 6 is preferably secured to the cover of the container. This positions the lamp 5 above the tops of the bottles 10. By placing the electric lamp directly above the tops of the bottles radiated heat is more directly above the tops of the bottles and a lesser amount of heat will prevent freezing of the contents. The attaching of the switch socket 6 to the cover 2 insures that the lamp 5 contained therein may be moved out of the way of the open top of the main portion 1 when the cover 2 is swung back on its hinges, thus permitting unrestricted placing of the bottles within the container 1 or the withdrawal of the same therefrom.

In my invention the heat for preventing freezing of the milk or cream is applied above the bottles containing the same, and this permits direct radiation in an efficient manner. This feature is very important, inasmuch as during exceedingly cold weather it is only necessary to prevent the beginning of the freezing action within the bottles and this is readily done by the heat radiated from the electric lamp. The cover 2 acts as a reflector of heat rays given off by the filament of lamp 5.

It is generally recognized that the freezing of milk inside the bottles is a decided inconvenience to the northernly located household, it is not however generally known that the freezing action has an injurious effect upon the properties of the milk itself. This is a matter of importance especially where the feeding of babies and invalids is concerned.

This device is economically operated by instructing the milkman to turn on the lamp when he leaves the milk only during freezing weather. The device remains in operation until the milk is later brought into the house.

The amount of heat may be regulated by the size of the lamp that is used.

I have used a flexible metal covering and also fiber tubing to prevent wear upon that section of the cord passing under the house door. In most cases it will be necessary to connect the plug 9 to an electric receptacle inside the house. This flexible covering may be moved back and forth to any position on the conductor cord and thus may be used to protect the conductor cord from wear at any point.

I claim:

1. A milk bottle chest comprising a container adapted to receive one or more bottles of milk, a cover hingedly secured and tightly fitting said container, and a heat generating means mounted upon and within said cover and positioned so as to be above the bottles of milk within the container when the cover is in closed position for maintaining the temperature within the container slightly above the freezing point; and means located within said container for controlling said generating means.

2. A milk bottle chest comprising a container adapted to receive one or more bottles of milk, a cover tightly fitting said container and hinged thereto so that it will open upwardly, and a heat generating means mounted upon and within said cover and positioned above the bottles of milk within the container when the cover is in closed position for maintaining the temperature within the container slightly above the freezing point, said heat generating means having a control mechanism positioned within the cover and neither exposed to nor operable from the outside.

3. A milk bottle chest comprising a container adapted to receive one or more bottles of milk, a cover tightly fitting said container and hinged thereto so that it will open upwardly, an electric socket and switch mounted upon and within said cover and adapted to receive an incandescent lamp, and an electrical conductor adopted to conduct electrical energy to said lamp whereby the temperature within the container may be maintained slightly above the freezing point.

4. A portable container adapted to receive one or more bottles of milk, a cover hingedly secured to and tightly fitting said container, an electric socket and switch mounted upon and within said cover and adapted to receive heat generating means whereby the temperature within the container may be maintained slightly above the freezing point, and an electrical conductor for connecting said socket with a source of electrical energy, said conductor being provided with a movable friction resisting covering.

ALAN L. BECKET.